(12) United States Patent
Thomsen

(10) Patent No.: US 6,675,234 B1
(45) Date of Patent: Jan. 6, 2004

(54) METHOD OF DETECTING TCP/IP BINDINGS OF INSTALLED NETWORK INTERFACE CARDS PRESENT IN A COMPUTER SYSTEM

(75) Inventor: Brant D. Thomsen, Sandy, UT (US)

(73) Assignee: 3Com Corporation, Santa Clara, CA (US)

(*) Notice: Subject to any disclaimer, the term of this patent is extended or adjusted under 35 U.S.C. 154(b) by 419 days.

(21) Appl. No.: 09/734,796

(22) Filed: Dec. 11, 2000

Related U.S. Application Data

(63) Continuation-in-part of application No. 09/568,098, filed on May 9, 2000.

(51) Int. Cl.[7] .......................... G06F 3/00; G06F 13/00; G06F 13/12
(52) U.S. Cl. .................. 710/19; 710/8; 710/15; 710/33; 710/62; 709/220; 709/224; 709/228
(58) Field of Search .................. 710/8, 15, 19, 710/16, 33; 709/220, 224, 223, 228

(56) References Cited

U.S. PATENT DOCUMENTS

| | | | | |
|---|---|---|---|---|
| 6,108,786 A | * | 8/2000 | Knowlson | 713/200 |
| 6,157,965 A | * | 12/2000 | Mohammed et al. | 710/8 |
| 6,195,712 B1 | * | 2/2001 | Pawlowski et al. | 710/19 |
| 6,289,388 B1 | * | 9/2001 | Disney et al. | 709/238 |

* cited by examiner

*Primary Examiner*—Jeffrey Gaffin
*Assistant Examiner*—Angel L. Casiano

(57) ABSTRACT

The present invention provides a method for detecting TCP/IP (Transmission Control Protocol/Internet Protocol) bindings for Network Interface Cards (NICs) installed on Windows 95™ and Windows 98™ operating systems with a VPN (Virtual Private Network) client present. More particularly, the present invention provides a method for parsing the Windows™ system registry to detect TCP/IP bindings for network interface cards installed within a host computer system. In one embodiment, a function for detecting TCP/IP bindings of one network interface card implemented and repeated for all keys of the registry of a computer software for detecting the TCP/IP bindings for network interface cards installed on the host computer system.

17 Claims, 7 Drawing Sheets

400

410
Determining a second registry key represented by a "HardWareKey" string value for first registry key

420
Determining a third registry key represented by a "Driver" string value for second registry key

430
Determining the ID value for the parent of the device represented by first registry key

440
Determining a fourth registry key represented by the parent ID value for the device

450
Determining a fifth registry key represented by a "HardWareKey" string value for fourth registry key

460
Provided there is a "HardWareID" string value for fifth registry key, the fifth registry key is the registry key for the NIC and the third registry key contains the TCP/IP settings for the NIC

FIG. 4

METHOD OF DETECTING TCP/IP BINDINGS OF INSTALLED NETWORK INTERFACE CARDS PRESENT IN A COMPUTER SYSTEM

RELATED APPLICATION

This Application is a Continuation-in-Part of co-pending commonly-owned U.S. patent application Ser. No. 09/568,098 filed May 9, 2000, entitled "METHOD OF DETECTING TCP/IP BINDINGS OF INSTALLED NETWORK INTERFACE CARDS PRESENT IN A COMPUTER SYSTEM" to Thomsen and Smith.

FIELD OF INVENTION

The present invention pertains generally to the field of computer networking. More particularly, the present invention pertains to software applications used for configuring networking hardware installed on a computer system.

BACKGROUND OF THE INVENTION

Computer networks can be arranged in numerous configurations and in a variety of network types. Some of the most popular types of networks are Ethernet (coaxial cable or twisted-pair cable), token ring, Fiber Distributed Data Interface (FDDI), Frame Relay, Integrated Services Digital Network (ISDN), X.25, and Synchronous Data Link Control (SDLC). Typically, these networks are arranged in local area networks (LANs) and wide area networks (WANs). Usually, LANs are distinguished from WANs based upon the geographical area they cover and sometimes the number of users connected to the network. For example, a group of personal computers (PC) in a home or single business site (location) usually communicate with each over a LAN. Groups of PCs that are at remote locations from one another, such as those in different homes, different companies, or different branch offices of the same company, typically communicate with each other over a WAN. Most WANs typically require significant resources to provide service to a large number of users spread over a vast geographical area causing a WAN to be relatively expensive to build and maintain.

Some users utilize the Internet for virtual private networking to avoid the costs of a true private WAN network and/or paying for long distance communication bills. In essence, virtual private networking entails encrypting and decrypting IP packets for transport across the Internet. In some virtual private networks (VPNs), the payload portion of an IP packet is encrypted for transport across the Internet. The header information is left intact so that routers can forward the packet as it traverses the Internet. In other VPNs, an entire IP packet is encrypted and then encapsulated into new IP packets for transport across the Internet.

One use of the VPN is that it allows a mobile computer system (e.g., a laptop) to be connected to a remote LAN. Typically, a user of the mobile computer system initiates a modem connection to an Internet Service Provider (ISP) and establishes an Internet session. Then, the mobile computer system sends an Internet message via the Internet to the remote LAN. The mobile system and the remote LAN then engage in a security protocol or handshaking to verify the user is an authorized user permitted to have access to the LAN. Once it is established the user is authorized to have access to the second LAN, a VPN is established, allowing the user and the remote computer system to access data stored within the LAN. VPN connections can also be established using a network interface card (NIC) instead of a modem. This is useful if the mobile computer system has a broadband connection, such as a digital subscriber line (DSL), cable modem, or hotel LAN.

Windows 95® and Windows 98® operating systems, however, do not provide native support for several types of VPNs. Therefore, a VPN software package is typically required to be installed in a system to provide for such specialized networking needs. "Virtual" NICs are often installed as part of a VPN software package. By way of background, "real" NICs are those associated with one or more pieces of hardware installed on the computer. They include PCI NIC cards, ISA NIC cards, PCMCIA NIC cards, USB NIC cards, etc. A "virtual" NIC is one that is not associated with any hardware. Some examples of "virtual" NICs include "Dial-Up Networking," "Internet Connection Sharing," and "VPN." Virtual NICs are well known in the art and are a common way of providing specialized networking support.

When a VPN client is installed under Windows 95® or Windows 98®, it redirects a NIC's TCP/IP bindings, sometimes using one or more software virtual NICs. This redirection is done in the Windows™ System registry. Since the various VPN clients use slightly different methods for redirecting the TCP/IP bindings, it becomes difficult for a software application to reliably detect the TCP/IP binding for a particular NIC. To make matters worse, when a VPN is installed, the standard detection scheme for determining where the TCP/IP settings for each NIC are located in the registry no longer works.

Accordingly, what is needed is a software application that allows an administrator or end-user to more easily modify the network settings associated with the Network Interface Cards (NICs) installed on a computer, whether or not a VPN client is installed.

SUMMARY OF THE INVENTION

The present invention provides a method for detecting TCP/IP (Transmission Control Protocol/Internet Protocol) bindings for Network Interface Cards (NICs) installed on Windows 95® and Windows 98® operating systems with a VPN (Virtual Private Network) client present. More particularly, the present invention provides a method for parsing the Windows™ system registry to detect TCP/IP bindings for network interface cards installed within a host computer system.

Specifically, in one embodiment, the present invention accomplishes the above described method by first opening the "HKEY_DYN_DATA\Config Manager\Enum" registry key. Then, for at least one key in the registry, the present invention performs a function.

The function performs several steps to detecting TCP/IP bindings of one network interface card. First, a second registry key represented by the location of a "HardWareKey" string value of the "HKEY_DYN_DATA\Config Manager\Enum" registry key is identified. A third registry key represented by the location of a "Driver" string value for second registry key is then identified. Next, the ID value for the parent of the device represented by the "HKEY_DYN_DATA\Config Manager\Enum" registry key is identified. A fourth registry key represented by the ID value for the parent of the device is then determined. Next, a fifth registry key represented by the "HardWareKey" string value for the fourth registry key is determined. Finally, if there is a "HardwareID" string value for the fifth registry key, the registry key for the network interface card and its corresponding TCP/IP settings has been determined. The third registry key contains the TCP/IP settings for the network interface card and the fifth registry key is a registry key for the network interface card. The third registry key and the fifth registry key are then stored in a list.

Upon the completion of detecting the TCP/IP bindings of all of the network interface cards, a final list is produced containing a listing of all network interface card devices and the registry location where the TCP/IP settings for each respective network interface card is stored.

These and other advantages of the present invention will become clear to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the present invention and, together with the description, serve to explain the principles of the invention.

FIG. 4 is a flow chart diagram illustrating process steps of a method for detecting TCP/IP bindings of one network interface card according to one embodiment of the present invention.

DETAILED DESCRIPTION OF THE PREFERRED EMBODIMENTS

In the following detailed description, for purposes of explanation, numerous specific details are set forth in order to provide a thorough understanding of the present invention. However, it will be apparent to one skilled in the art that the present invention may be practiced without these specific details. In other instances, well-known structures and devices are not described in detail in order to avoid obscuring aspects of the present invention.

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here and generally conceived to be a self-consistent sequence of steps of instructions leading to a desired result. The steps are those requiring physical manipulations of data representing physical quantities to achieve tangible and useful results. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing", "determining", "generating", "associating", "assigning" or the like, refer to the actions and processes of a computer system, or similar electronic computing device. The computer system or similar electronic device manipulates and transforms data represented as electronic quantities within the computer system's registers and memories into other data similarly represented as physical quantities within the computer system memories into other data similarly represented as physical quantities within the computer system memories or registers or other such information storage, transmission, or display devices.

COMPUTER SYSTEM PLATFORM

Figure 1:
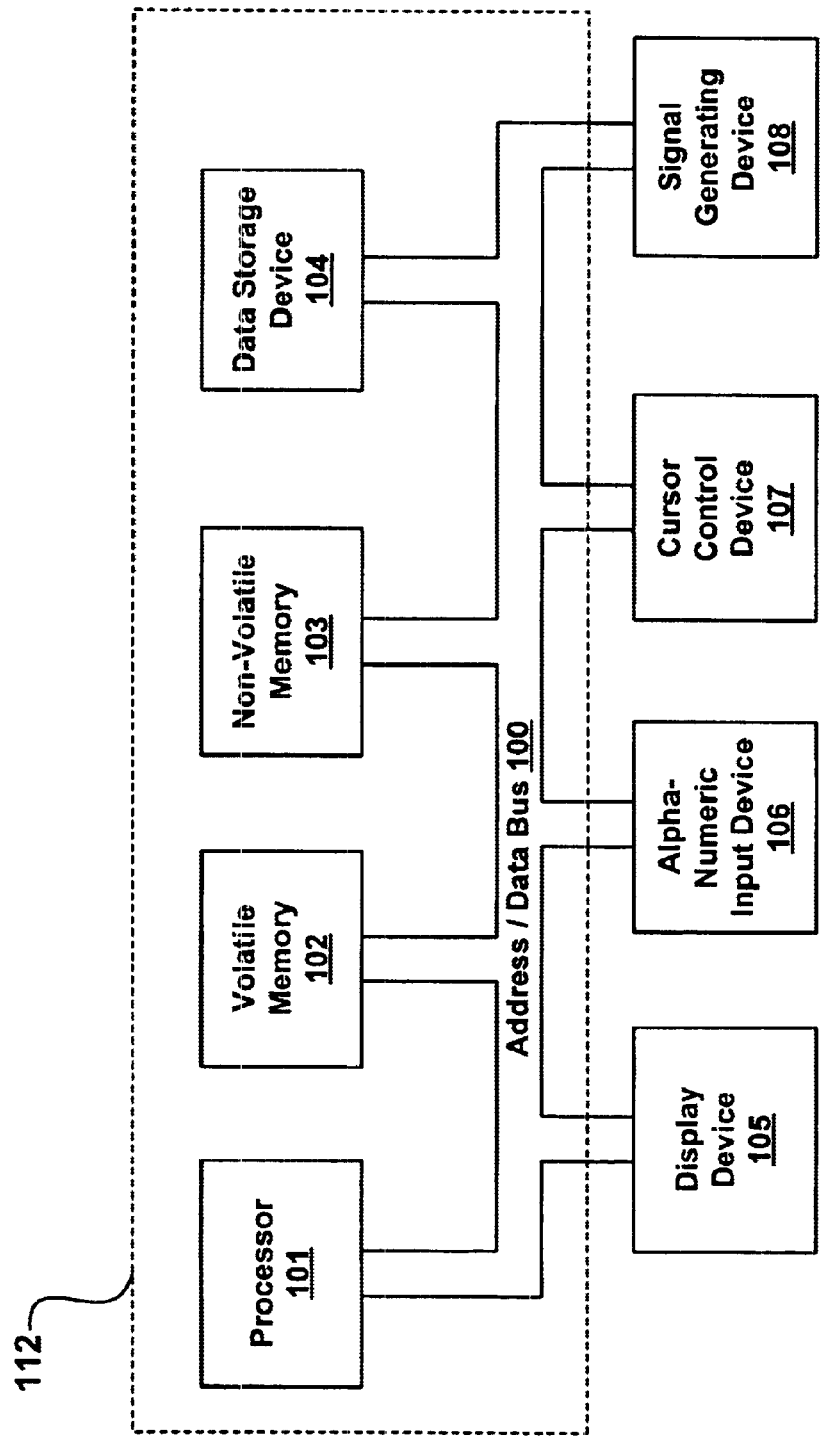
FIG. 1 illustrates an exemplary computer system platform upon which embodiments of the present invention may be practiced.

With reference to FIG. 1, portions of the present invention are comprised of computer-readable and computer executable instructions which reside, for example, in computer-usable media of a computer system. FIG. 1 illustrates an exemplary computer system 112 on which embodiments (e.g., process 300) of the present invention may be practiced. It is appreciated that system 112 of FIG. 1 is exemplary only and that the present invention can operate within a number of different computer systems including general purpose computer systems, embedded computer systems, and stand alone computer systems specially adapted for controlling automatic test equipment.

Computer system 112 includes an address/data bus 100 for communicating information, a central processor 101 coupled with bus 100 for processing information and instructions, a volatile memory 102 (e.g., random access memory RAM) coupled with the bus 100 for storing information and instructions for the central processor 101 and a non-volatile memory 103 (e.g., read only memory ROM) coupled with the bus 100 for storing static information and instructions for the processor 101. Computer system 112 also includes a data storage device 104 ("disk subsystem") such as a magnetic or optical disk and disk drive coupled with the bus 100 for storing information and instructions. Data storage device 104 can include one or more removable magnetic or optical storage media (e.g., diskettes, tapes) which are computer readable memories. Memory units of system 112 include volatile memory 102, non-volatile memory 103 and data storage device 104.

Computer system 112 can further include an optional signal generating device 108 (e.g., a modem, or a network interface card "NIC") coupled to the bus 100 for interfacing with other computer systems. Also included in computer system 112 of FIG. 1 is an optional alphanumeric input device 106 including alphanumeric and function keys coupled to the bus 100 for communicating information and command selections to the central processor 101. Computer system 112 also includes an optional cursor control or directing device 107 coupled to the bus 100 for communicating user input information and command selections to the central processor 101. An optional display device 105 can also be coupled to the bus 100 for displaying information to the computer user. Display device 105 may be a liquid crystal device, other flat panel display, cathode ray tube, or other display device suitable for creating graphic images and alphanumeric characters recognizable to the user. Cursor control device 107 allows the computer user to dynamically signal the two dimensional movement of a visible symbol (cursor) on a display screen of display device 105. Many implementations of cursor control device 107 are known in the art including a trackball, mouse, touch pad, joystick or special keys on alphanumeric input device 106 capable of signaling movement of a given direction or manner of displacement. Alternatively, it will be appreciated that a cursor can be directed and/or activated via input from alphanumeric input device 106 using special keys and key sequence commands. The present invention is also well suited to directing a cursor by other means such as, for example, voice commands.

SYSTEM REGISTRY OF WINDOWS™ OPERATING SYSTEMS

The system registry is a database used for storing settings and options for Microsoft® Windows™ operating systems including Windows 95® and Windows 98®. The registry contains information and settings for many of the hardware, software, users, and preferences of a computer system. Whenever a user makes changes to a "Control Panel" settings, file associations, system policies, or installs new software and/or hardware, the changes are usually reflected and stored in the system registry. In most Windows 95® and Windows 98® computer systems, the physical files that make up the registry are stored in two hidden files under the "C:\WINDOWS" directory, called "USER.DAT" and "SYSTEM.DAT," and can be edited with a Registry Editor (regedit.exe) that is included in most versions of Windows™ operating systems.

Figure 2:
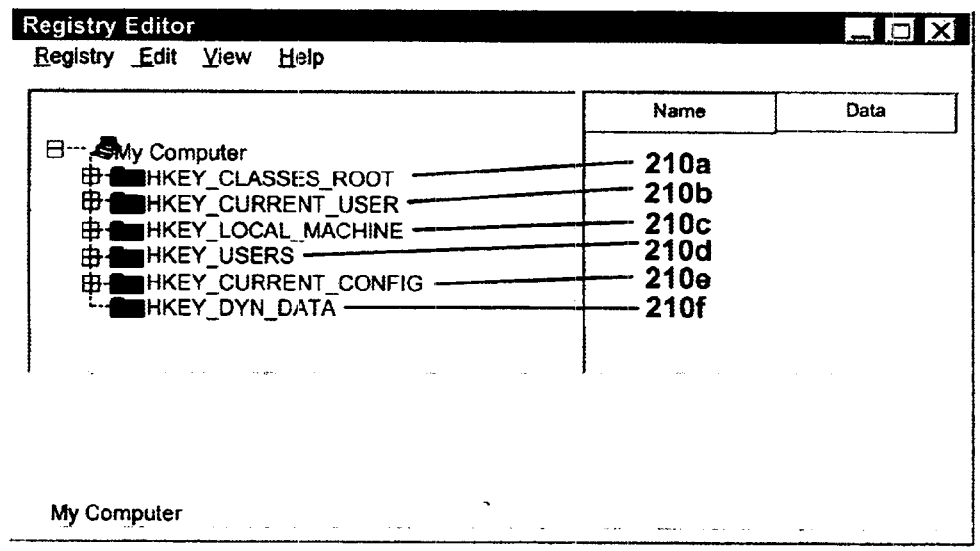
FIG. 2 is a graphical representation of an exemplary system registry.

The system registry has a hierarchical structure. Although the registry looks complicated, its structure is similar to the directory structure of a file system. An exemplary hierarchical structure of the system registry Windows 95® and Windows 98®, as graphically illustrated by registry editor "regedit.exe" is shown in FIG. 2. As illustrated, each main branch 210a–210f (denoted by a folder icon) is called a hive, and hives contains keys. Each key can contain other keys (sometimes referred to as sub-keys), as well as values. The values contain the actual information stored in the system registry. In Windows 95® and Windows 98®, there are three types of values: string, binary, and DWORD. There are six main branches 210a–210f, each containing a specific portion of the information stored in the system registry. The branch name and descriptions of their corresponding content are illustrated below in Table 1.

TABLE 1

| Branch Names | Content Description |
| --- | --- |
| HKEY_CLASSES_ROOT | This branch contains file association types, OLE information and shortcut data. |
| HKEY_CURRENT_USER | This branch links to the section of HKEY_USERS corresponding to the user currently logged onto the PC. |
| HKEY_LOCAL_MACHINE | This branch contains computer specific information about the type of hardware, software, and other preferences on a given PC. This information is used by all users who use the given computer. |
| HKEY_USERS | This branch contains individual preferences for each user of the computer. Each user is represented by a SID sub-key located under the main branch. |
| HKEY_CURRENT_CONFIG | This branch links to the section of HKEY_LOCAL_MACHINE appropriate for the current hardware configuration. |
| HKEY_DYN_DATA | This branch points to the part of HKEY_LOCAL_MACHINE, for use with the Plug-&-Play features of Windows ™, this section is dynamic and will change as devices are added and removed from the system. |

METHOD OF DETECTING TCP/IP BINDINGS OF INSTALLED NETWORK INTERFACE CARDS

The present invention applies to Windows 95 and Windows 98 computers. "The Configuration Manager is the central component of the Plug and Play architecture. Working in conjunction with other components, the Configuration Manager finds workable configurations for all devices of the computer so that each device can use its assigned IRQ number, I/O port addresses, and other resources without conflict with other devices. The Configuration Manager also helps monitor the computer for changes in the number and type of devices present and manages the reconfiguration of the devices as needed when changes take place." [Microsoft's MSDN Library documentation, April 2000 Library, Configuration Manager section introduction]

The Configuration Manager assigns a value ("Device ID") to each device it enables. This value is used by Configuration Manager to keep track of that device. The value assigned to a device may be different each time a device is enabled, and is different from the Device ID values assigned to every other device.

Figure 3:
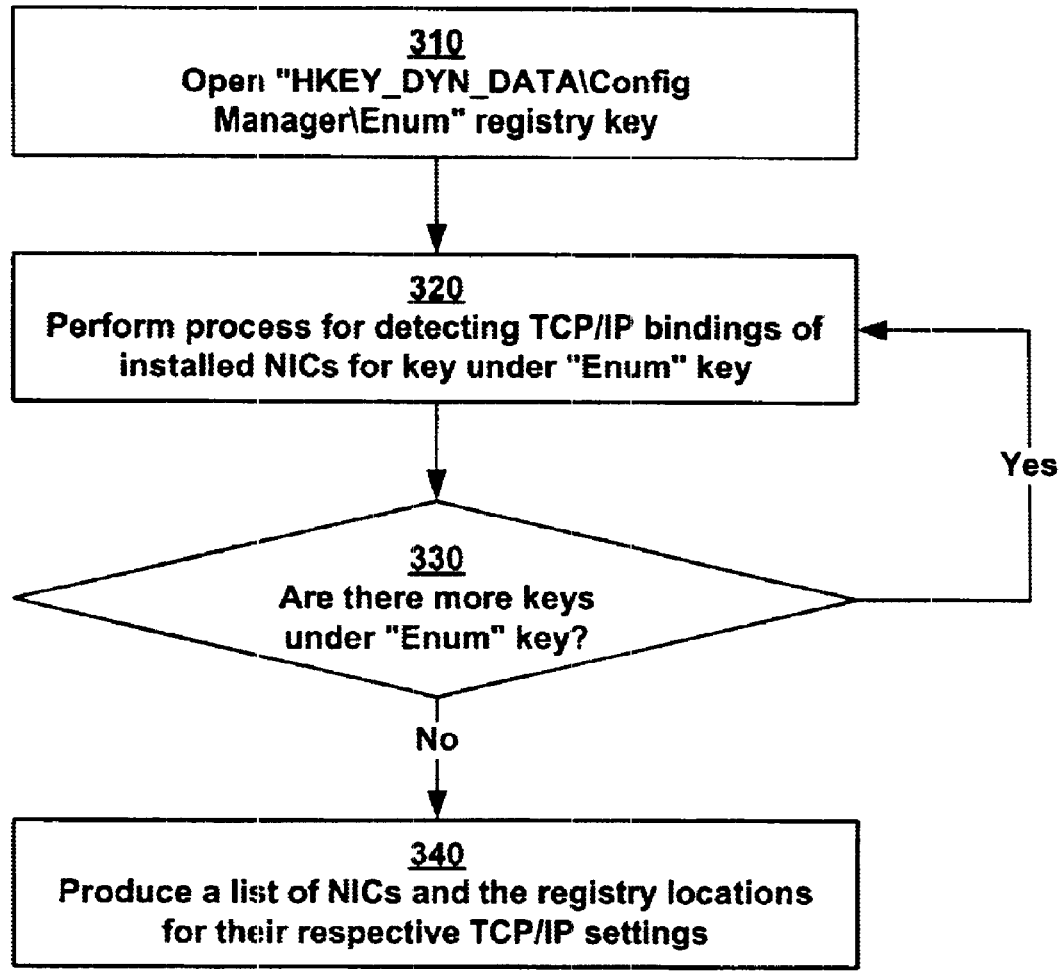
FIG. 3 is a flow chart diagram illustrating process steps of a method for detecting TCP/IP bindings of installed network interface cards according to one embodiment of the present invention.

The following method, as shown in FIG. 3, can be used to discover where in the registry TCP/IP settings are located that correspond to active (currently working) NICs, and to determine which NIC uses a particular set of TCP/IP settings. FIG. 3 is a flow chart diagram illustrating process steps of a method 300 for detecting TCP/IP bindings of installed network interface cards according to one embodiment of the present invention. Steps of method 300, in the present embodiment, may be implemented with any computer languages used by those of ordinary skill in the art.

At step 310 of process 300, the "HKEY_DYN_DATA\Config Manager\Enum" key in the registry is opened. The values assigned to each device are available under the "HKEY_DYN_DATA\Config Manager\Enum" key in the registry. Each of the subkeys below this key is the string representation of an 8-digit hexadecimal number. The number used by the key is the "Device ID" value for a device on the system.

Along with assigning values to devices, Configuration Manager also keeps track of relationships between devices. Each device can have a "Parent" device and/or a "Child" device. A device that enables another device is its "Parent" device. Devices can also have "Sibling" devices, which are how Configuration Manager deals with devices that have more than one child.

A Network Interface Card (NIC) and the TCP/IP driver instance assigned to that NIC are linked by this Parent/Child relationship. Typically, the NIC device is the direct parent of the TCP/IP driver device. However, there may be other devices in between them, such as when a Virtual Private Network (VPN) is installed, so that the NIC is the "grandparent" or "great grandparent" of the TCP/IP driver device.

Still with reference to FIG. 3, at step 320 of method 300, a method is performed for detecting the TCP/IP bindings of one network interface card. This method is completed for one or more keys under the "Enum" key. In one embodiment of the present invention, the method for detecting the TCP/IP bindings of one network interface card is performed on every key under the "Enum" key. Examples of the method of step 320 are described below (e.g. method 400 of FIG. 4 and method 500 of FIG. 5).

At step 330 of process 300, in one embodiment of the present invention, it is determined whether or not there are remaining keys under the "Enum" key. If so, step 320 is repeated until all remaining keys under the "Enum" key have had the method of step 320 performed. It should be appreciated that it is not necessary that all keys under the "Enum" key require the method of step 320 performed. The method is repeated to ensure that all NICs and their corresponding TCP/IP binding locations are determined.

At step 340 of process 300, in one embodiment of the present invention, a list is produced containing the locations of the NICs and the registry locations for the TCP/IP settings for each NIC.

FIG. 4 is a flow chart diagram illustrating process steps of a method for detecting TCP/IP bindings of one network interface card according to one embodiment of the present invention. In one embodiment, method 400 is the method described above in step 320 of method 300 (FIG. 3). In one embodiment, method 400 is carried out, as shown above in method 300 (FIG. 3), for each key in the registry under the "Enum" key.

At step 410 of method 400, a second registry key represented by the location of a "HardWareKey" string value of the "HKEY_DYN_DATA\Config Manager\Enum" registry key is identified.

At step 420 of method 400, a third registry key represented by the location of a "Driver" string value for second registry key is identified.

At step 430 of method 400, the ID value for the parent of the device represented by the "HKEY_DYN_DATA\Config Manager\Enum" registry key is identified.

At step 440 of method 400, a fourth registry key represented by the ID value for the parent of the device is determined.

At step 450 of method 400, a fifth registry key represented by the "HardWareKey" string value for the fourth registry key is determined.

At step 460 of method 400, provided there is a "HardwareID" string value for the fifth registry key, the registry key for the network interface card and its corresponding TCP/IP settings has been determined. The third registry key contains the TCP/IP settings for the network interface card and the fifth registry key is a registry key for the network interface card.

Figure 5A:
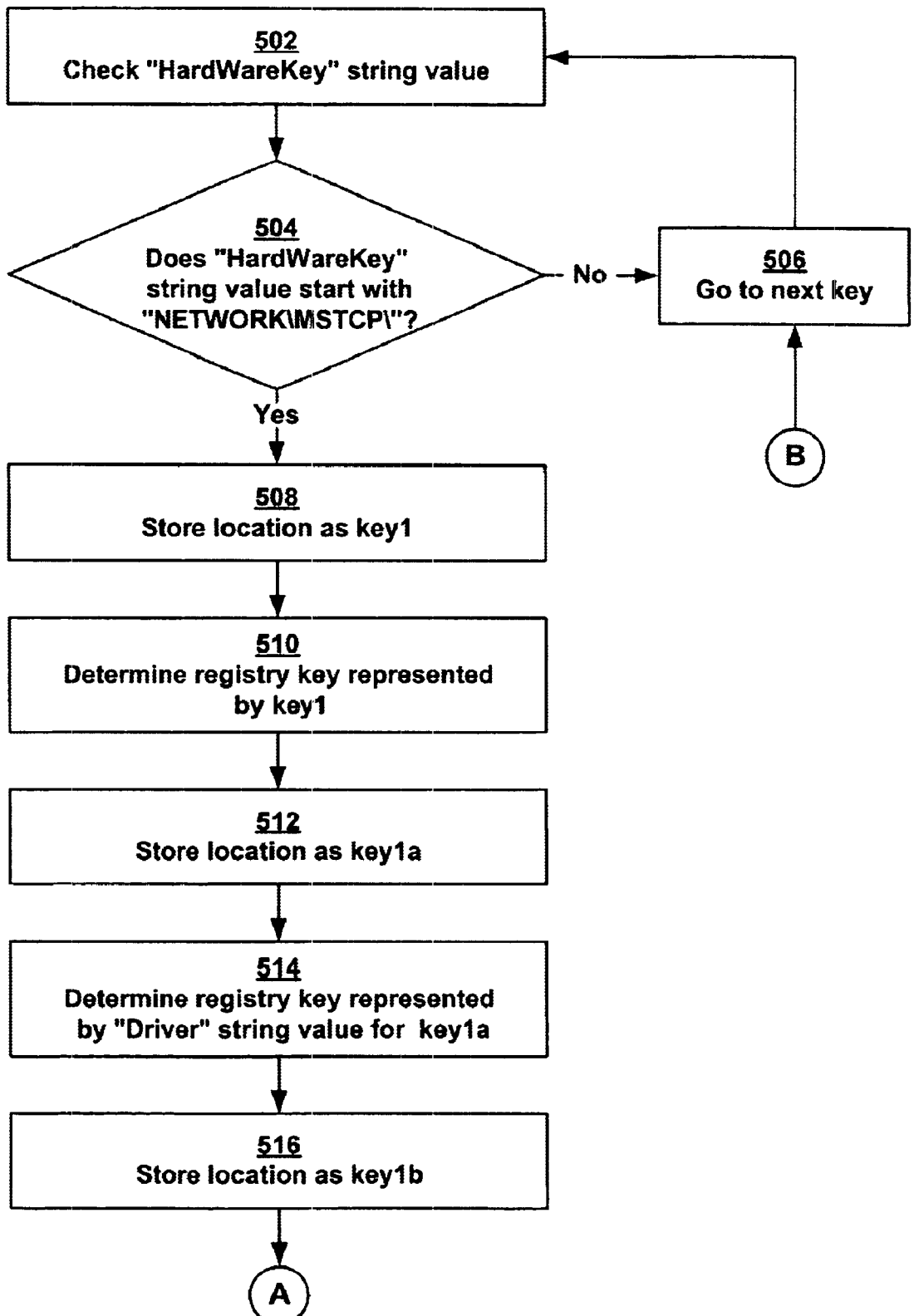
FIGS. 5A, 5B and 5C are flow chart diagrams illustrating process steps of a method for detecting TCP/IP bindings of one network interface card according to one embodiment of the present invention.
Figure 5B:
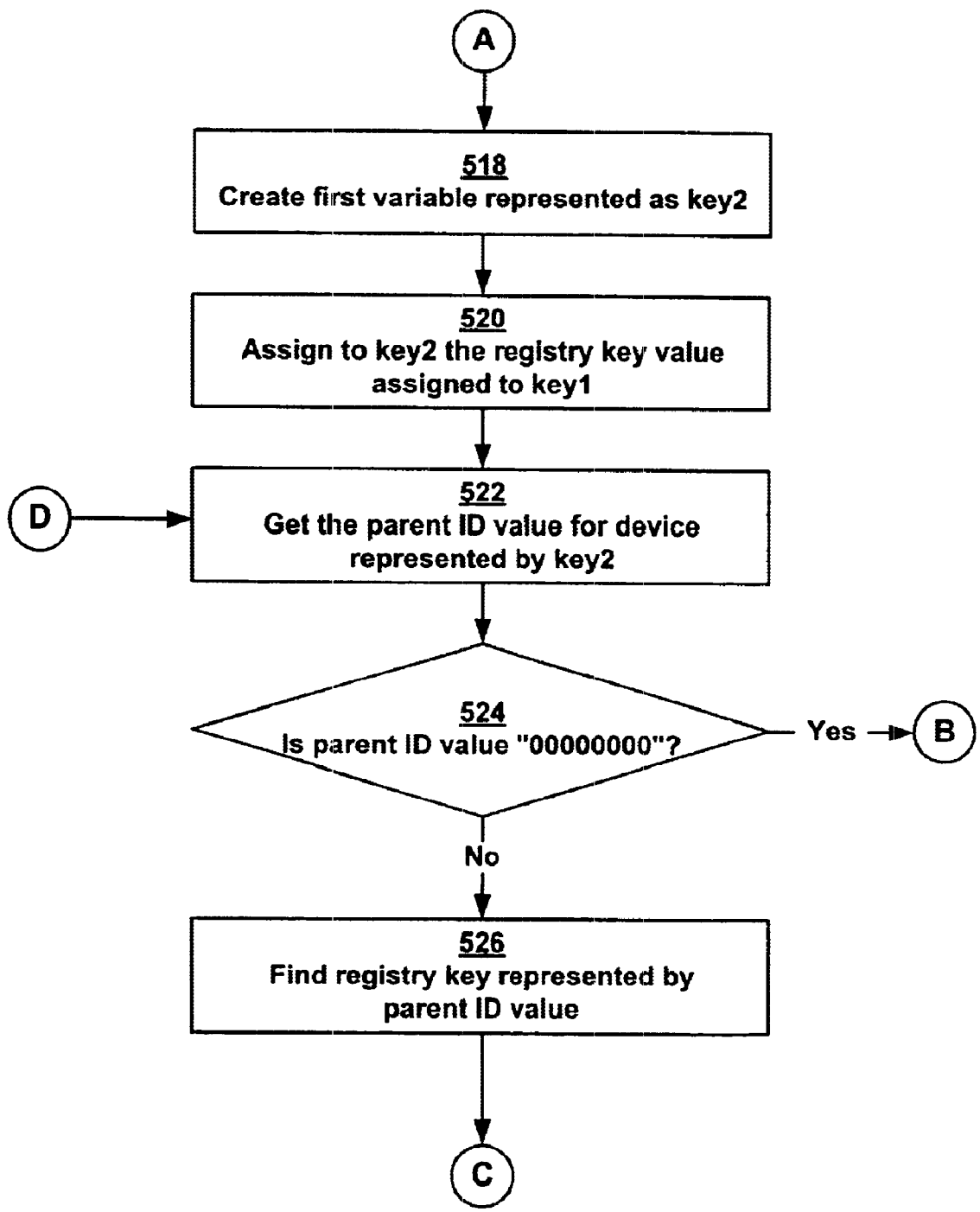
Figure 5C:
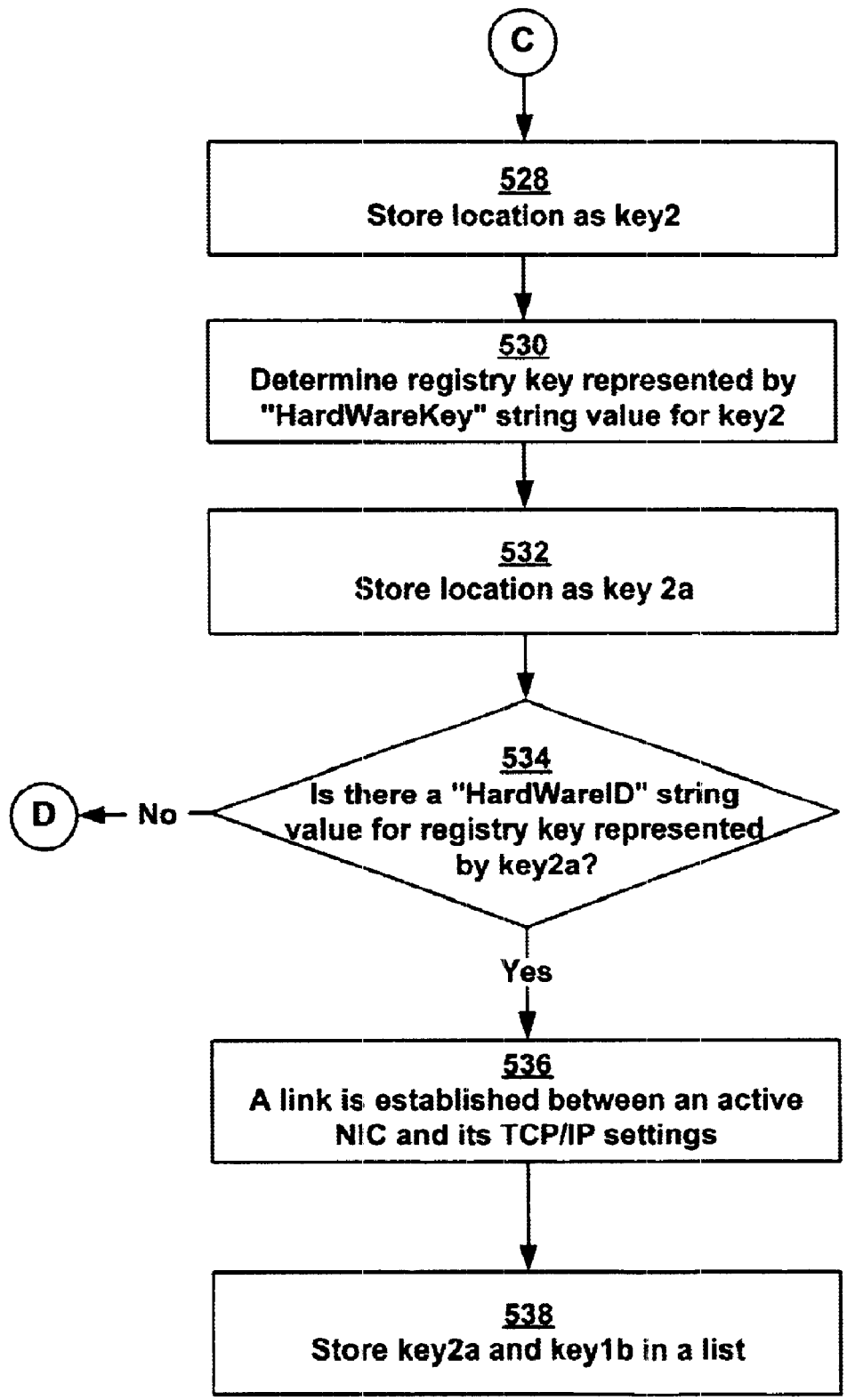

FIGS. 5A, 5B and 5C are flow chart diagrams illustrating process steps of a method 500 for detecting TCP/IP bindings of one network interface card according to one embodiment of the present invention. In one embodiment, method 500 is the method described above in step 320 of method 300 (FIG. 3). In one embodiment, method 500 is carried out, as shown above in method 300 (FIG. 3), for each key in the registry under the "Enum" key.

Referring first to FIG. 5A, at step 502 of method 500, the "HardWareKey" string value of the "HKEY_DYN_DATA\Config Manager\Enum" registry key is checked. At step 504 of method 500, it is determined whether or not the "HardWareKey" string value checked at step 502 starts with the string "NETWORK\MSTCP\".

If the "HardWareKey" string value checked at step 502 does not start with the string "NETWORK\MSTCP\", as shown in step 506 of method 500, the present registry key can be ignored. The next registry key is then checked, as shown in step 502.

If the "HardWareKey" string value checked at step 502 does start with the string "NETWORK\MSTCP\", as shown in step 508 of method 500, the location of the registry key is stored. For the purposes of method 500, this key is referred to as key1.

At step 510 of method 500, the registry key represented by the "HardWareKey" string value for key1 is determined. This key will be under the "HKEY_LOCAL_MACHINE\Enum" tree. For example, the string value "NETWORK\MSTCP\0000" would represent the Registry key "HKEY_LOCAL_MACHINE\Enum\NETWORK\MSTCP\0000".

At step 512 of method 500, the location of this derived registry key is stored. For the purposes of method 500, this key is referred to as key1a.

At step 514 of process 500, the registry key represented by the "Driver" string value for key1a is determined. This key will be under the "HKEY_LOCAL_MACHINE\System\CurrentControlSet\Services\Class" tree. For example, the string value "NetTrans\0002" would represent the Registry key "HKEY_LOCAL_MACHINE\System\CurrentControlSet\Services\Class\NetTrans\0002".

At step 516 of method 500, the location of this derived registry key is stored. For the purposes of method 500, this key is referred to as key1b.

With reference to FIG. 5B, at step 518 of method 500, another variable is created for storing the location of a registry key. At step 520 of method 500, this variable is given the same registry key value assigned to key1. For the purposes of method 500, this key is referred to as key2.

At step 522 of method 500, the ID value for the parent of the device represented by key2 is retrieved. In one embodiment, this is accomplished by calling a system CONFIGMG_Get_Parent Windows system call and passing it the name of the key represented by key2. Under Windows 98(or later), the parent ID value of the device represented by key2 is the "Parent" binary value for key2, so this method could also be used to get the ID value for the parent of the device.

At step 524 of process 500, it is determined whether the ID value for the parent of the device is "00000000" then the device does not have a parent. If the ID value for the parent of the device is "00000000", this key can be ignored, and method 500 returns to step 506 and proceeds to the next key.

If the ID value for the parent of the device is not "00000000", as shown in step 526 of method 500, the registry key represented by the parent ID value for the device is found. For example, if the parent ID value were the hexadecimal number "C2A19570", then the registry key would be "HKEY_DYN_DATA\Config Manager\Enum\C2A19570".

With reference to FIG. 5C, at step 528 of method 500, the location of this derived registry key is stored. For the purposes of method 500, this key is referred to as key2.

At step 530 of method 500, the Registry key represented by the "HardWareKey" string value for key2 is determined. This key will be under the "HKEY_LOCAL_MACHINE\Enum" tree. For example, the string value "ROOT\NET\0000" would represent the registry key "HKEY_LOCAL_MACHINE\Enum\ROOT\NET\0000".

At step 532 of method 500, the location of this derived registry key is stored. For the purposes of method 500, this key is referred to as key2a.

At step 534 of method 500, it is determined whether or not there is a "HardwareID" string value for the registry key represented by key2a. If there is not a "HardwareID" string value for the registry key represented by key2a, the method returns to step 522 to process steps 522 through 534 under the new string value for key2.

If there is a "HardwareID" string value for the registry key represented by key2a, as shown in step 536 of method 500, a link has been found between an active NIC device and its TCP/IP settings. The registry key for the NIC device is key2a, and its TCP/IP settings for that device are stored in Registry key key1b.

At step 538 of method 500, the values for key2a and key1b are stored in a list for later use, as described in step 340 of method 300 (FIG. 3).

The present invention, a method of parsing the Windows™ system registry to detect TCP/IP (Transmission Control Protocol/Internet Protocol) bindings for network interface cards (NICs) installed on a computer system, has thus been disclosed. The present invention allows such determination to be made automatically and easily through the examination of the system registry. While the present invention has been described in particular embodiments, it should be appreciated that the present invention should not be construed as limited by such embodiments, but should be construed according to the claims below.

What is claimed is:

1. In a computer system, a method of detecting the TCP/IP binding location for a network interface card, wherein said method is adapted for causing said computer system to perform steps comprising of:
   a) opening a first registry key;
   b) for at least one key in said first registry key, performing a function, wherein said function is adapted for causing said computer system to perform steps of:
      b1) identifying a second registry key represented by the location of a "HardWareKey" string value of said first registry key;
      b2) identifying a third registry key represented by the location of a "Driver" string value for said second registry key;
      b3) identifying the ID value for the parent of the device represented by said first registry key;
      b4) determining a fourth registry key represented by said ID value for the parent of said device; and
      b5) determining a fifth registry key represented by the "HardWareKey" string value for said fourth registry key.
      b6) provided there is a "HardwareID" string value for said fifth registry key, said third registry key contains the TCP/IP settings for said network interface card and said fifth registry key is a registry key for said network interface card.

2. The method as recited in claim 1 wherein said step b1) comprises the steps of:
   provided the "HardWareKey" string value of said first registry key starts with the string "NETWORK\MSTCP\", storing said "HardWareKey" string value, said "HardWareKey" string value represented as key1;
   determining a second registry key represented by the "HardWareKey" string value for key1, said second registry key located under the "HKEY_LOCAL_MACHINE\Enum" tree; and
   storing said second registry key, said second registry key represented as key1a.

3. The method as recited in claim 1 wherein said step b2) comprises the steps of:
   determining a third registry key represented by a "Driver" string value for key1a, said third registry key located under the "HKEY_LOCAL_MACHINE\System\CurrentControlSet\Services\Class" tree; and
   storing said third registry key, said third registry key represented as key1b.

4. The method as recited in claim 1 wherein said step b3) comprises the steps of:
   creating a first variable for storing a location of a registry key, said first variable referred to as key2;
   assigning key2 the same registry key value assigned to key1; and
   determining the ID value for the parent of the device represented by key2.

5. The method as recited in claim 1 wherein said step b4) comprises the steps of:
   provided said parent ID value is not "00000000", finding a fourth registry key represented by said parent ID value for said device; and
   storing the location of said fourth registry key, said location of said fourth registry key represented as key2.

6. The method as recited in claim 1 wherein said step b5) comprises the steps of:
   determining a fifth registry key represented by the "HardWareKey" string value for key2, said fifth registry key located under the "HKEY_LOCAL_MACHINE\Enum" tree;
   storing said fifth registry key, said fifth registry key represented as key2a; and
   provided there is a "HardwareID" string value for said fifth registry key represented as key2a, storing said third registry key represented as key1b in a list and storing said fifth registry key represented as key2a in said list, wherein said string value represented by key2a is a registry key for said network interface card and wherein said string value represented as key1b are the TCP/IP settings for said network interface card.

7. The method as recited in claim 1 further comprising the step of:
   c) producing a list, wherein said list is a listing of said network interface card devices and a registry location where said TCP/IP settings for each network interface card is stored.

8. The method as recited in claim 4 wherein said step of determining the ID value for the parent of the device represented by key2 is accomplished by calling a system CONFIGMG_Get_Parent system call and passing it the name of the registry key represented by key2.

9. In a computer system running on an operating system, a method of detecting the TCP/IP binding location for a network interface card, wherein said method is adapted for causing said computer system to perform steps comprising of:
   a) opening a first registry key;
   b) for at least one key in said first registry, performing a function, wherein said function adapted for causing said computer system to perform steps of:
      b1) provided the "HardWareKey" string value of said first registry key starts with the string "NETWORK\MSTCP\", storing said "HardWareKey" string value, said "HardWareKey" string value represented as key1;

b2) determining a second registry key represented by the "HardWareKey" string value for key1, said second registry key located under the "HKEY_LOCAL_MACHINE\Enum" tree; and b3) storing said second registry key, said second registry key represented as key1a.

10. The method as recited in claim 9 wherein step b) further comprises steps of:

determining a third registry key represented by a "Driver" string value for key1a, said third registry key located under the "HKEY_LOCAL_MACHINE\System\CurrentControlSet\Services\Class" tree; and storing said third registry key, said third registry key represented as key1b.

11. The method as recited in claim 10 wherein step b) further comprises steps of:

creating a first variable for storing a location of a registry key, said first variable referred to as key2;

assigning key2 the same registry key value assigned to key1; and determining the ID value for the parent of the device represented by key2.

12. The method as recited in claim 11 wherein step b) further comprises steps of:

provided said parent ID value is not "00000000", finding a fourth registry key represented by said parent ID value for said device; and storing the location of said fourth registry key, said location of said fourth registry key represented as key2.

13. The method as recited in claim 12 wherein step b) further comprises steps of:

determining a fifth registry key represented by the "HardWareKey" string value for key2, said fifth registry key located under the "HKEY_LOCAL_MACHINE\Enum" tree;

storing said fifth registry key, said fifth registry key represented as key2a; and provided there is a "HardwareID" string value for said fifth registry key represented as key2a, storing said third registry key represented as key1b in a list and storing said fifth registry key represented as key2a in said list, wherein said string value represented by key2a is a registry key for said network interface card and wherein said string value represented as key1b are the TCP/IP settings for said network interface card.

14. The method as recited in claim 13 further comprising the step of:

c) producing said list, wherein said list is a listing of said network interface card devices and the registry location where said TCP/IP settings for each network interface card is stored.

15. The method as recited in claim 11 wherein said step of determining the ID value for the parent of the device represented by key2 is accomplished by calling a system CONFIGMG_Get_Parent system call and passing it the name of the registry key represented by key2.

16. The method as recited in claim 9 wherein said operating system is a Windows™-based operating system.

17. In a computer system running on a Windows™ based operating system, a method of detecting the TCP/IP binding location for a network interface card, wherein said method is adapted for causing said computer system to perform steps comprising of:

a) opening a first registry key;

b) for at least one key in said first registry, performing a function, wherein said function is adapted for causing said computer system to perform steps of:

b1) provided the "HardWareKey" string value of said first registry key starts with the string "NETWORK\MSTCP\", storing said "HardWareKey" string value, said "HardWareKey" string value represented as key1;

b2) determining a second registry key represented by the "HardWareKey" string value for key1, said second registry key located under the "HKEY_LOCAL_MACHINE\Enum" tree;

b3) storing said second registry key, said second registry key represented as key1a;

b4) determining a third registry key represented by a "Driver" string value for key1a, said third registry key located under the "HKEY_LOCAL_MACHINE\System\CurrentControlSet\Services\Class" tree;

b5) storing said third registry key, said third registry key represented as key1b;

b6) creating a first variable for storing a location of a registry key, said first variable referred to as key2;

b7) assigning key2 the same registry key value assigned to key1;

b8) determining the ID value for the parent of the device represented by key2;

b9) provided said parent ID value is not "00000000", finding a fourth registry key represented by said parent ID value for said device;

b10) storing the location of said fourth registry key, said location of said fourth registry key represented as key2;

b11) determining a fifth registry key represented by the "HardWareKey" string value for key2, said fifth registry key located under the "HKEY_LOCAL_MACHINE\Enum" tree;

b12) storing said fifth registry key, said fifth registry key represented as key2a;

b13) provided there is a "HardwareID" string value for said fifth registry key represented as key2a, storing said third registry key represented as key1b in a list and storing said fifth registry key represented as key2a in said list, wherein said string value represented by key2a is a registry key for said network interface card and wherein said string value represented as key1b are the TCP/IP settings for said network interface card;

c) producing said list, wherein said list is a listing of said network interface card devices and the registry location where said TCP/IP settings for each network interface card is stored.

* * * * *